US011848702B2

(12) United States Patent
Sondericker, III et al.

(10) Patent No.: US 11,848,702 B2
(45) Date of Patent: *Dec. 19, 2023

(54) LIFI NETWORK AND ASSOCIATED METHOD

(71) Applicant: Dialight Corporation, Farmingdale, NJ (US)

(72) Inventors: John Herbert Sondericker, III, Colorado Springs, CO (US); Rizwan Ahmad, Edison, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/381,915

(22) Filed: Jul. 21, 2021

(65) Prior Publication Data

US 2021/0359757 A1 Nov. 18, 2021

Related U.S. Application Data

(63) Continuation of application No. 16/795,747, filed on Feb. 20, 2020, now Pat. No. 11,095,367.

(60) Provisional application No. 62/808,380, filed on Feb. 21, 2019.

(51) Int. Cl.
*H04B 10/11* (2013.01)
*H04B 10/116* (2013.01)
*H04B 10/516* (2013.01)
*H04B 10/40* (2013.01)

(52) U.S. Cl.
CPC ........... *H04B 10/116* (2013.01); *H04B 10/11* (2013.01); *H04B 10/40* (2013.01); *H04B 10/516* (2013.01)

(58) Field of Classification Search
CPC ...... H04B 10/116; H04B 10/11; H04B 10/40; H04B 10/516
USPC .................. 398/118–131, 135–139, 182–201
See application file for complete search history.

(56) References Cited

U.S. PATENT DOCUMENTS

| 5,978,373 | A | 11/1999 | Hoff et al. | |
|---|---|---|---|---|
| 6,323,980 | B1 * | 11/2001 | Bloom | H04W 88/085 398/116 |
| 8,463,130 | B2 * | 6/2013 | Ma | H04B 10/1149 398/115 |
| 8,503,886 | B1 | 8/2013 | Gunasekara et al. | |

(Continued)

OTHER PUBLICATIONS

Bazzi et al, Visible light communications as a complementary technology for the internet of vehicles, Jul. 2016, Computer Communications, All Document. (Year: 2016).*

(Continued)

*Primary Examiner* — Dibson J Sanchez
(74) *Attorney, Agent, or Firm* — Tong, Rea, Bentley & Kim, LLC (57) ABSTRACT

The present disclosure is directed to examples of a light fixture. In one embodiment, the light fixture includes a light source to emit a light, a photo detector to detect an incoming light, a transceiver to receive incoming data and transmit data, a modulator/demodulator to modulate the light with the data and to demodulate the incoming light with the incoming data, and a processor communicatively coupled to the light source, the photo detector, the transceiver, and the modulator/demodulator, wherein the processor is to control the modulator/demodulator to modulate the light at a transmission frequency to transmit the data via the light.

7 Claims, 5 Drawing Sheets

(56) References Cited

U.S. PATENT DOCUMENTS

| | | |
|---|---|---|
| 9,386,668 B2 | 7/2016 | Knapp et al. |
| 9,596,029 B2 | 3/2017 | Addy |
| 9,945,960 B2 | 4/2018 | Hartman et al. |
| 10,509,101 B2 | 12/2019 | Hartman et al. |
| 2003/0030386 A1 | 2/2003 | Leeb et al. |
| 2006/0056855 A1 | 3/2006 | Nakagawa et al. |
| 2007/0024571 A1* | 2/2007 | Maniam ............. H04B 10/116 345/102 |
| 2007/0153026 A1* | 7/2007 | Ashdown ............. H03K 7/08 345/691 |
| 2007/0222581 A1 | 9/2007 | Hawkins et al. |
| 2008/0048582 A1* | 2/2008 | Robinson ............. H03K 7/08 315/291 |
| 2008/0111500 A1* | 5/2008 | Hoover ............. H05B 45/10 315/293 |
| 2008/0304833 A1 | 12/2008 | Zheng |
| 2009/0110405 A1 | 4/2009 | Lee et al. |
| 2009/0196613 A1* | 8/2009 | Linnartz ............. H05B 45/22 398/118 |
| 2010/0284690 A1 | 11/2010 | Rajagopal et al. |
| 2010/0308736 A1 | 12/2010 | Hung et al. |
| 2011/0038638 A1 | 2/2011 | Son et al. |
| 2011/0288658 A1 | 11/2011 | Walters et al. |
| 2012/0040606 A1 | 2/2012 | Verfuerth |
| 2013/0044488 A1 | 2/2013 | Hreish |
| 2013/0293117 A1 | 11/2013 | Verfuerth |
| 2014/0056588 A1 | 2/2014 | Schenk et al. |
| 2014/0099107 A1* | 4/2014 | Ravich ............. H04B 10/116 398/43 |
| 2014/0219663 A1* | 8/2014 | Roberts ............. H04B 10/524 398/185 |
| 2014/0255038 A1 | 9/2014 | Richards, IV |
| 2014/0328597 A1 | 11/2014 | Bhide |
| 2015/0023668 A1 | 1/2015 | Spaulding et al. |
| 2015/0078741 A1 | 3/2015 | O'connor et al. |
| 2015/0147064 A1 | 5/2015 | Hartman et al. |
| 2015/0163870 A1* | 6/2015 | Fan ............. H03K 7/08 315/246 |
| 2015/0163881 A1* | 6/2015 | Pederson ............. H04B 10/116 315/154 |
| 2016/0112127 A1* | 4/2016 | Zhi ............. H04B 10/116 398/118 |
| 2016/0344476 A1 | 11/2016 | Pederson et al. |
| 2017/0006679 A1* | 1/2017 | Chin ............. H05B 45/10 |
| 2017/0086270 A1* | 3/2017 | Büthker ............. H05B 45/48 |
| 2018/0091227 A1* | 3/2018 | Dolgin ............. H04B 10/5561 |
| 2018/0205459 A1 | 7/2018 | Verma et al. |
| 2018/0254835 A1* | 9/2018 | Breuer ............. H05B 47/19 |
| 2019/0182671 A1 | 6/2019 | Magnan et al. |
| 2019/0254137 A1* | 8/2019 | Sevo ............. H05B 47/115 |
| 2020/0195343 A1 | 6/2020 | Solanki |

OTHER PUBLICATIONS

Kumar et al, Visible Light Communication for Intelligent Transportation in Road Safety Applications, Jul. 2011, IWCMC, All Document. (Year: 2011).*

McBride et al, Transitioning to Hybrid Radio Optical Networks, Nov. 2014, IEEE, pp. All Document. (Year: 2014).

International Search Report and Written Opinion mailed in corresponding PCT/US2020/019046 dated May 11, 2020, 19 pages.

Kim et al, Performance Improvement in Visible Light Communication by Using Spread Spectrum Coding, Jul. 2010, OECC, All Document. (Year: 2010).

* cited by examiner

LIFI NETWORK AND ASSOCIATED METHOD

CROSS REFERENCE TO RELATED APPLICATIONS

This application is a continuation of recently allowed U.S. patent application Ser. No. 16/795,747, filed on Feb. 20, 2020, which claims priority under 35 U.S.C. § 119(e) to U.S. provisional patent application Ser. No. 62/808,380, filed on Feb. 21, 2019. Both of these applications are hereby incorporated by reference in their entireties.

BACKGROUND

Industry today relies on the transmission of data. Data is continuously transmitted for monitoring, automation control, and the like. Typically, data can be transmitted over wired and wireless networks that are deployed for transmitting data. For example, fiber optics networks and wireless networks with routers and gateways may be deployed to build a communication network. The cost to deploy these networks can be very expensive.

SUMMARY

In one embodiment, the present disclosure provides a light fixture. In one embodiment, the light fixture comprises a light source to emit a light, a photo detector to detect an incoming light, a transceiver to receive incoming data and transmit data, a modulator/demodulator to modulate the light with the data and to demodulate the incoming light with the incoming data, and a processor communicatively coupled to the light source, the photo detector, the transceiver, and the modulator/demodulator, wherein the processor is to control the modulator/demodulator to modulate the light at a transmission frequency to transmit the data via the light.

In one embodiment, the present disclosure provides a lighting system data network. In one embodiment, the lighting system data network comprises a data source to transmit data, a first light fixture to receive the data and to transmit a modulated light signal with the data, a second light fixture to receive the modulated light signal with the data, to demodulate the modulated light signal with the data, and to transmit the data to a data destination, and a data destination to receive the data.

In one embodiment, the present disclosure provides a method for transporting data across a lighting system data network. In one embodiment, the method comprises receiving, via a processor of a light fixture, data, modulating, by the processor, a light emitted by the light fixture to carry the data, and transmitting, by the processor, the light that is modulated to carry the data to a second light fixture.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides a lighting system data network that can transmit data across multiple lighting fixtures. As noted above, industry today relies on the transmission of data. Data is continuously transmitted for monitoring, automation control, and the like. Typically, data can be transmitted over wired and wireless networks that are deployed for transmitting data. For example, fiber optics networks and wireless networks with routers and gateways may be deployed to build a communication network. The cost to deploy these networks can be very expensive.

However, all facilities use lights to illuminate the facilities. Thus, using the lights inside of a facility to transport data may reduce the overall costs for implementing a separate communication network to transmit the data.

Examples of the present disclosure build upon the existing technology known as visible light communications (VLC) and LiFi, both of which use light to transmit information. The present disclosure extends the previous technologies by fitting the lighting fixture with both a transmitter and receiver such that data may be sent to and from fixture to fixture. Notably, no other previous VLC systems uses two or more lighting fixtures for data transmission using light.

In some embodiments, the light used may be visible, infrared, or ultraviolet. The light may be modulated at various frequencies to transmit the data. In some embodiments, a lighting fixture and a laptop dongle device enabling the access-point to the network over the lighting system data network (also referred to herein as the LiFi network) may be deployed.

Thus, the present disclosure can use lighting fixtures in a location to transmit data. Using the lighting fixtures can significantly reduce the cost for data networks in a facility or location compared to deploying a separate data network.

Figure 1:
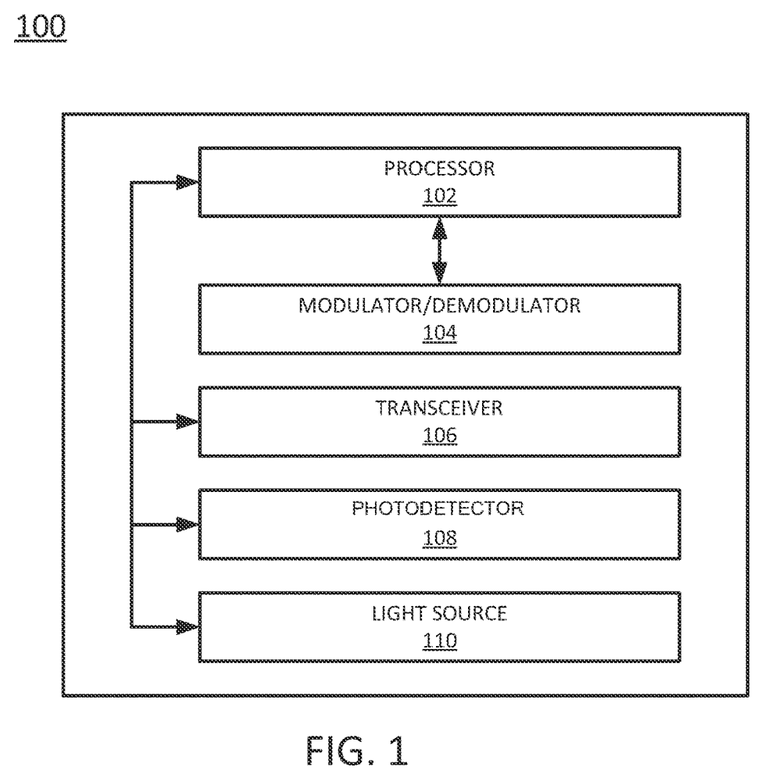
FIG. 1 depicts a block diagram of one embodiment of a light fixture of the present disclosure.

FIG. 1 illustrates an example light fixture 100 of the present disclosure. Multiple instances of the light fixture 100 may be deployed as part of a lighting system data network illustrated in FIGS. 2-5 and discussed in further details below.

In one embodiment, the light fixture 100 may include a processor 102, a modulator/demodulator 104, a transceiver 106, a photodetector 108, and a light source 110. The processor 102 may be communicatively coupled to the modulator/demodulator 104, the transceiver 106, the photodetector 108, and the light source 110 to control operation of the modulator/demodulator 104, the transceiver 106, the photodetector 108, and the light source 110.

In one embodiment, the light source 110 may include at least one light emitting diode (LED). The light source 110 may include an array of LEDs that can be used to illuminate a location and be modulated to transmit data. In one embodiment, the light emitted by the light source may have a wavelength between approximately 380 nanometers (nm) to 780 nm. It should be noted that the term light and light signal may be used interchangeably herein.

In one embodiment, the light source 110 may include two different LEDs. For example, an array of a first type of LED may be used to emit light at wavelengths to illuminate a location. An array of a second type of LED may be used to carry data. The light or light signal emitted by the second type of LED may be modulated, as discussed in further details below, to carry the data.

In one embodiment, the photodetector 108 may detect incoming light signals. The detected incoming light signals may be provided to the processor 102 for processing. For example, the incoming light signals may be demodulated by the modulator/demodulator 104 to obtain data that is carried by the incoming light signals.

In one embodiment, the modulator/demodulator 104 may modulate a light emitted by the light source 110 to carry data. The modulator/demodulator 104 may also demodulate incoming light detected by the photodetector 108 to obtain data carried by the incoming light, as noted above. In one embodiment, the modulator/demodulator 104 may apply a broadband modulation to the light signal. For example, the data may be transmitted over a wide bandwidth of frequencies at a lower overall power.

In one embodiment, the modulator/demodulator 104 may modulate the light the signal using a spread spectrum modulation encoding. For example, the data may be broken up into different frequencies and then aligned by a modulator/demodulator 104 of a receiving light fixture 100 to retrieve the data from the light signal. The spread spectrum modulation encoding may offer a secure transmission of the data with low interference. The data may be carried by the light signals over a wide range of frequencies having a relatively low power density compared to a narrowband signal. Different types of spread spectrum modulation encoding may include frequency hopped spread spectrum (FHSS), direct sequence spread spectrum (DSSS), and the like. The DSSS may transmit data with pseudo-random number sequences.

In one embodiment, the spread spectrum encoding contains inherent noise tolerance which may allow proper signal reception in an area with multiple fixtures transmitting information simultaneously. Due to the potential use of reflected light that the lighting network data network (e.g., illustrated in FIG. 3 and discussed below) of the present disclosure may use, this ability may be used to decode a clear signal from a noisy environment.

In one embodiment, the light may be modulated by turning the light source 110 on and off. The light source 110 may be turned on and off at a frequency that is fast enough to be unnoticeable by a human eye, but can be detected by the photodetector 108 and processed by the processor 102 and the modulator/demodulator 104.

In one embodiment, the light may be modulated by changing a brightness of the light source 110. For example, the brightness of the light source 110 may be increased and decreased at a desired frequency. For example, the brightness may be varied with 16 or 24 bit resolution and can convey more information than turning the light source 110 on and off.

In one embodiment, the light may be modulated at a frequency between 10 kilohertz to 770 terahertz. In one embodiment, the light may be modulated at a frequency between 420 terahertz to 770 terahertz. In one embodiment, the light may be modulated at a frequency between 10 kilohertz to 1 terahertz.

In one embodiment, the transceiver 106 may be a combination of a transmitter and transceiver. The transceiver 106 may be a wireless transceiver that can communicate via wireless signals (e.g., radio frequency (RF) signals). The transceiver 106 may receive data from a data source. The data may then be processed by the processor 102 onto a modulated light signal. The transceiver 106 may transmit data that is demodulated from a light signal to a data destination.

In one embodiment, the light fixture 100 may also include an optional band pass filter (not shown). The band pass filter may filter out undesired light wavelengths and/or frequencies. The band pass filter may prevent light pollution from other light sources in a location that can cause false signals from being processed by the light fixture 100.

Figure 2:
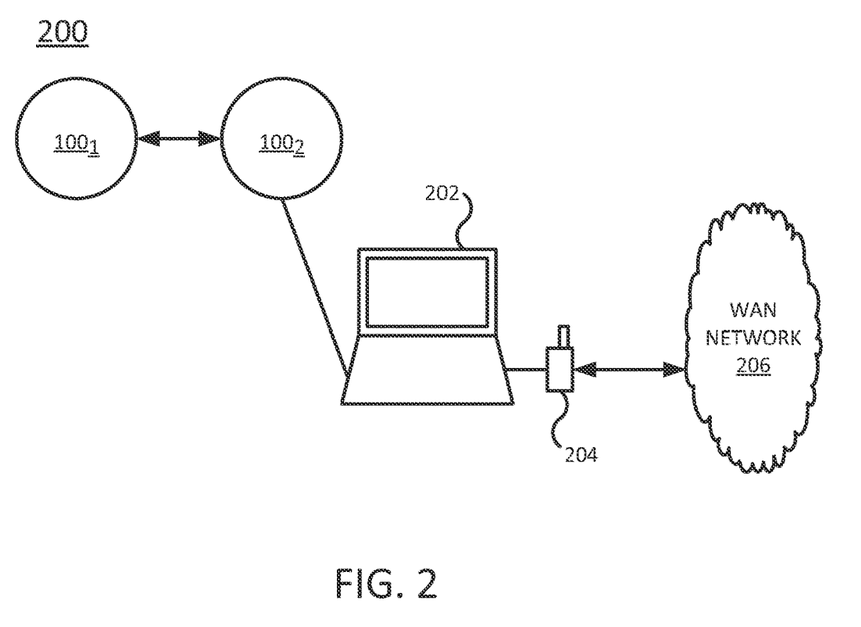
FIG. 2 depicts a block diagram of one embodiment of an example of a lighting system data network that includes the light fixtures of the present disclosure.

FIG. 2 illustrates an example of a light system data network 200 of the present disclosure. The light system data network 200 may include a plurality of light fixtures 100. The example in FIG. 2 illustrates two light fixtures 100₁ and 100₂. However, it should be noted that any number of light fixtures may be deployed.

In one embodiment, the two light fixtures 100₁ and 100₂ may communicate bi-directionally. For example, the light fixture 100₁ may transmit modulated light signals that carry data, as described above, to the light fixture 100₂, and vice versa. The light fixture 100₂ may measure the incoming modulated light using the photodetector 108. As a result, digital information may be transmitted from the light fixture 100₁ to the light fixture 100₂. This communication technique may be referred to as LiFi.

As noted above, the present disclosure leverages the light fixtures 100 of the present disclosure to provide the LiFi link between two or more light fixtures 100. In contrast, current LiFi communication networks are limited between one light fixture and an access point. In other words, current LiFi communication networks do not have a light fixture that can communicate with other light fixtures.

In one embodiment, the data may be retrieved by the light fixture 100₂ from demodulating the modulated light received from the light fixture 100₁. The data may then be transmitted to a computing device 202. The computing device 202 may be a laptop computer, a desktop computer, a tablet computer, and the like, that includes a dongle 204 that is wirelessly connected to a wide area network (WAN) 206. The WAN 206 may be an Internet protocol (IP) network. The data may then be transmitted by the computing device 202 to any desired data destination that is connected to the WAN 206.

Figure 3:
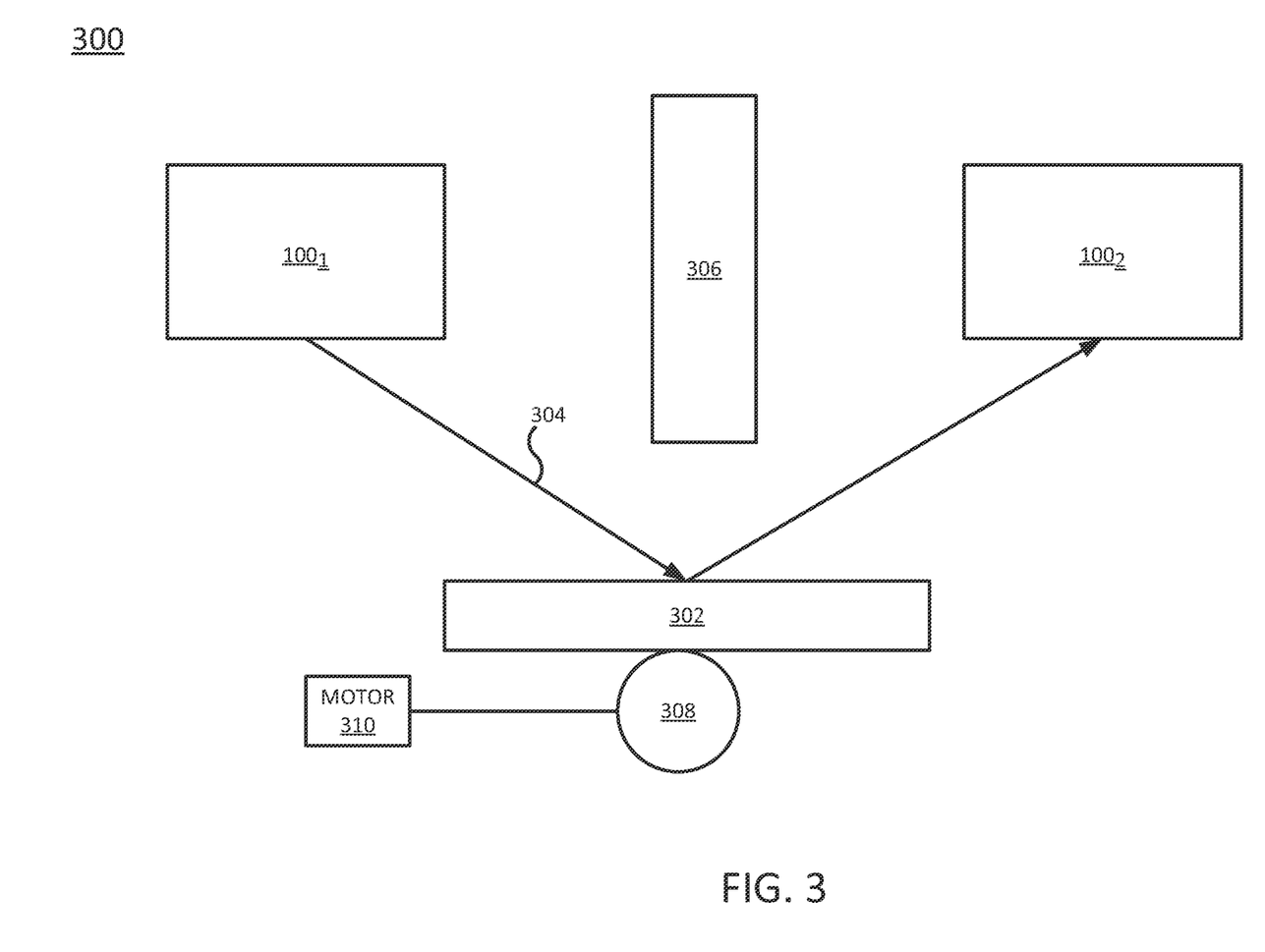
FIG. 3 depicts a block diagram of one embodiment of an example of a lighting system data network that uses reflected light to communicate of the present disclosure.

FIG. 3 illustrates a block diagram of an example light system data network 300 that uses reflected light to communicate of the present disclosure. The vast majority of light that enters the human eye reaches that point via one or more reflections off of surrounding surfaces. Illumination we see on the surfaces of rooms, buildings, and streets is the result of reflected light entering the eye. This principle can be used to extend conventional LiFi data transmission to allow the creation of continuous tree or mesh networks, useful in forming networks for home, commercial, and industrial purposes.

In one embodiment, the light system data network 300 may include a reflector 302. The reflector 302 may be a fixed mirror, a reflector, a metalized reflector, and the like. Although a single reflector 302 is illustrated in FIG. 3 for ease of explanation, it should be noted that any number of reflectors 302 may be deployed in a location. In addition, the reflectors 302 may all be the same type of reflector or may be different types of reflectors.

In one embodiment, using reflected light may allow a communication link to be formed between two light fixtures $100_1$ and $100_2$ without having a light signal 304 travel directly from the light fixture $100_1$ to the light fixture $100_2$. Rather, the light signal 304 may arrive via a reflected path. In other words, the two lighting fixtures $100_1$ and $100_2$ may not be arranged or positioned such that there is a direct line of sight. Said another way, an obstruction or structure 306 may be located between the two lighting fixtures, and the light signal 304 may be reflected by the reflector 302 to allow the two light fixtures $100_1$ and $100_2$ to still communicate.

In one embodiment, the light sources 110 of the light fixtures $100_1$ and $100_2$ may be adjusted or calibrated to emit the light signal 304 in a direction towards the reflector 302. The LEDs of the light sources 110 may be moved to emit the light signal 304 towards the reflector 302, reflectors or optics (not shown) within the light fixtures $100_1$ and $100_2$ may be used, or the light fixtures $100_1$ and $100_2$ may be installed or mounted in such a way to direct the light signal 304 towards the reflector 302.

In one embodiment, the reflector 302 may be coupled to or mounted on a gimbal or movable mount 308. The mount 308 may be coupled to a motor 310. The motor may move the mount 308 under the control of a controller (not shown) to reflect the light signal 304. For example, the reflector 302 may be angled to allow the light signal 304 to be reflected towards the light fixture $100_2$. The reflector 302 may then be moved to angle the light signal 304 to another light fixture 100 that may be located nearby.

The ability to reflect the light signal 304 may be valuable as the reflected path is far easier to implement and allows the implementation of a true LiFi fixture—one in which the primary LED light that provides illumination is also the light that is used for data transport. The amount of light produced by one conventional LED fixture may be large enough to detect via a reflected path at considerably remote distances.

Figure 4:
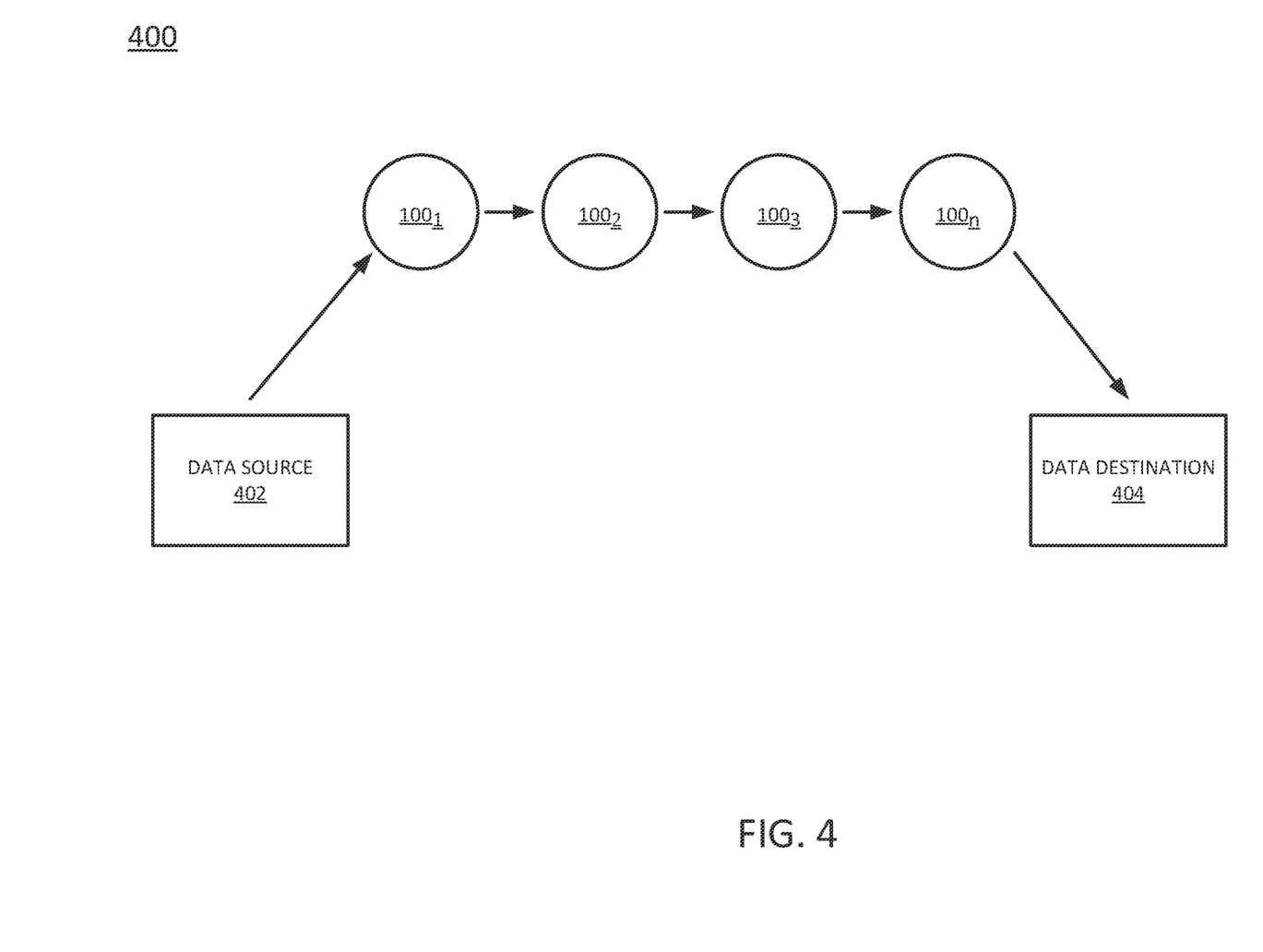
FIG. 4 depicts a block diagram of an example lighting system data network of the present disclosure.

FIG. 4 illustrates a block diagram of one embodiment of an example light system data network 400 of the present disclosure. In one embodiment, the light system data network 400 may be a backhaul network for non-lighting-centric data. The data transmitted by a data source 402 and received by the data destination 404 may include non-lighting data and may be transmitted across the light fixtures $100_1$ to $100_n$.

For example, as discussed above, data may be transmitted from the data source 402 to an adjacent or nearby light fixture $100_1$. The light fixture $100_1$ may receive the data and modulate a light signal to carry the data to a data destination 404. The data source 402 may be a machine, a sensor, a security camera, a piece of equipment in a factory, a computing device in an office building, and the like. The data source 402 may transmit operation data or control signal data. The data destination 404 may be a remotely located server, another sensor, another computing device at a different office building, another machine, and the like In one embodiment, the light signal modulated by the light fixture $100_1$ may be passed along subsequent light fixtures $100_2$-$100_n$. The last light fixture $100_n$ may demodulate the light signal to obtain the data carried by the modulated light signal. The light fixture $100_n$ may then transmit the data to the data destination (e.g., over the WAN illustrated in FIG. 2, and discussed above). The function of the lighting system data network 400 as a data transport network may have many possible implementations as an "available everywhere" network which can be tapped to send or to receive data from a remote or centralized location.

In one embodiment, the data source 402 may include hardware that may be LiFi enabled. For example, the data source 402 may also include a light source, a modulator/demodulator, and a photodetector to transmit and receive modulated light signals that carry data generated by the data source 402. The data source 402 may directly communicate with the light fixture $100_1$ such that the light fixture $100_1$ may simply pass the modulated light signal. In other words, the light fixture $100_1$ may not have to perform the modulation of the light signal.

Figure 5:
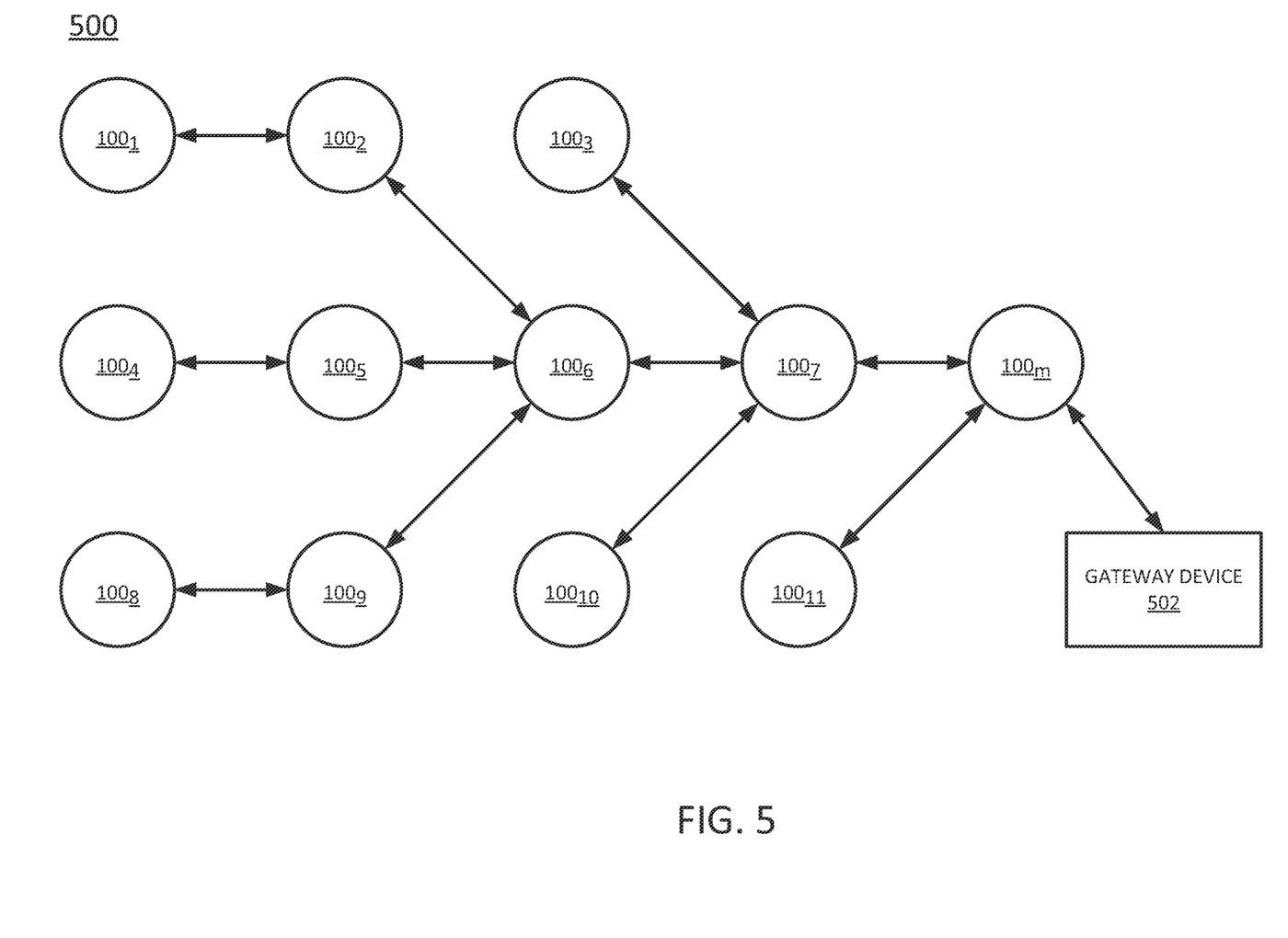
FIG. 5 depicts a block diagram of an example lighting system data network organized in a tree structure of the present disclosure.

FIG. 5 illustrates a block diagram of an example lighting system data network 500 that is organized in a tree structure of the present disclosure. The light fixtures 100 can be organized in a variety of different ways. One example is a tree structure as illustrated in FIG. 5.

The tree structure may lead back to a central network coordinator or be realized in a mesh network configuration. The flexibility of the way the light fixtures 100 can be arranged may be useful when forming a network in a difficult environment.

In one embodiment, the lighting system data network 500 may include a plurality of light fixtures $100_1$ to $100_m$. A subset of light fixtures $100_4$-$100_m$ may form a backbone or central line of the lighting system data network 500. For example, the light fixtures $100_4$-$100_m$ may represent parent nodes of a tree.

Other light fixtures (e.g., light fixtures $100_1$, $100_2$, $100_3$, $100_8$, $100_9$, $100_{10}$, and $100_{11}$) may branch off from the light fixtures $100_4$ to $100_m$ in the central line. The other light fixtures $100_1$, $100_2$, $100_3$, $100_8$, $100_9$, $100_{10}$, and $100_{11}$ may represent child nodes of the tree.

In one embodiment, one of the light fixtures (e.g., the last light fixture $100_m$) may serve as a central network coordinator. The light fixture $100_m$ may communicate with a gateway device 502. All of the data carried by various different modulated light signals may be demodulated by the light fixture $100_m$. The data from the different modulated light signals may then be transmitted over a communications network or WAN via the gateway device 502.

In one embodiment, the gateway device 502 may include a LiFi transceiver and may transmit and receive light signals. The gateway device 502 may include a connection interface to the WAN. The connection interface may be an Ethernet connection or a wireless connection.

This example light system data network 500 illustrated in FIG. 5 may have several advantages when compared to conventional networking technology. First, the network 500 may be wireless. Second, the network 500 may not be constrained by regulations as is found in the radio frequency spectrum. Third, the network 500 may offer the ability for very high speed communications. The arrangement of the light system data network 500 may be formed similar to radio-based tree or mesh network such as is used in ZigBee networks. However, unlike these other types of networks, the network 500 of the present disclosure may be built on LiFi-based communication, as opposed to radio-based communication. Another benefit of using the lighting fixtures 100 in the network 500 is that in a typical installation, the network 500 may have good network coverage because the light fixtures 100 are naturally spread throughout a facility.

Figure 6:
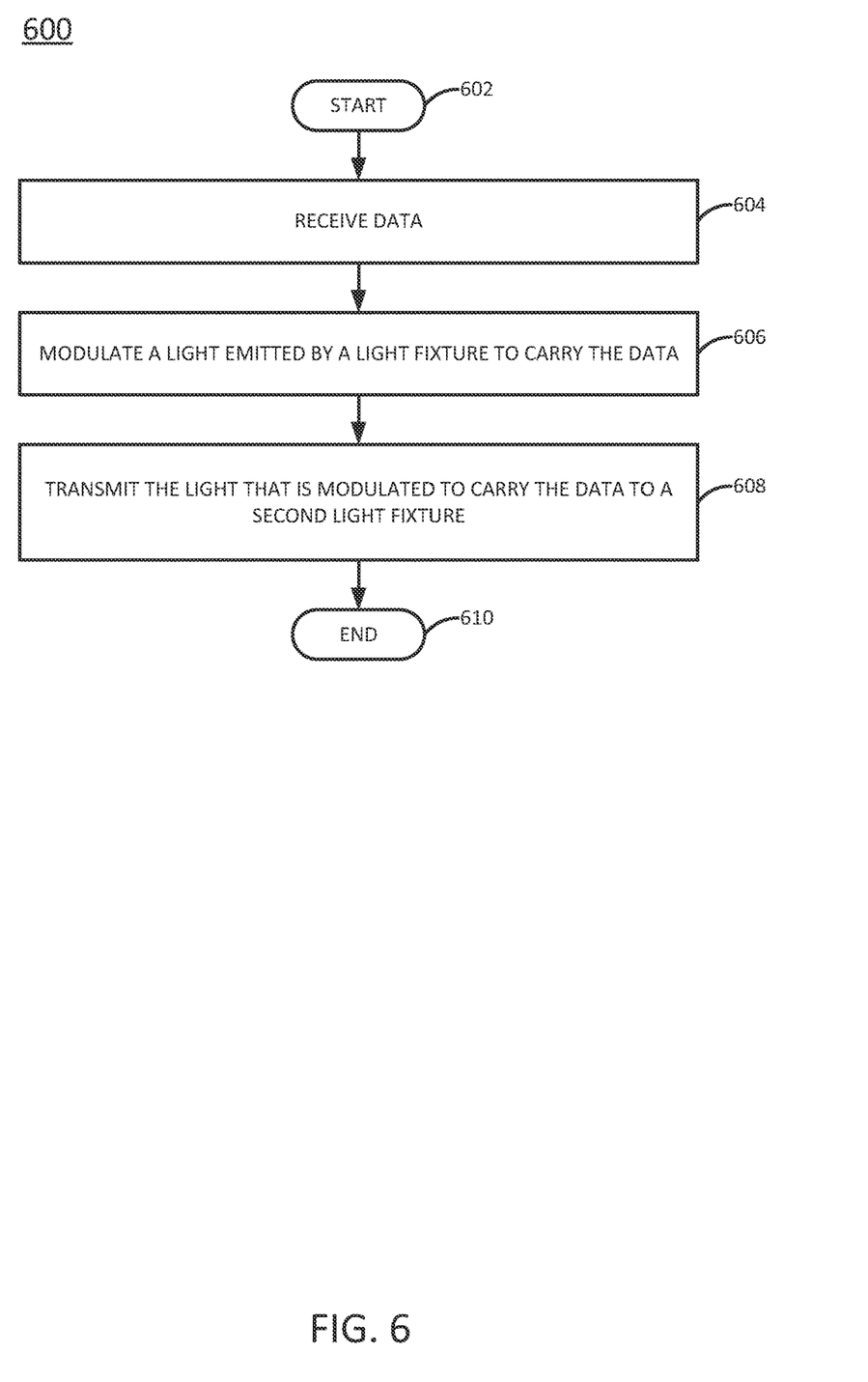
FIG. 6 depicts a flow diagram of an example method for transporting data across a lighting system data network of the present disclosure.

FIG. 6 illustrates a flowchart of one embodiment of a method 600 for transporting data across a lighting system data network of the present disclosure. In one embodiment, the method 600 may be executed by the lighting fixture 100.

The method 600 begins at block 602. At block 604, the method 600 receives data. For example, the data may be non-light related data. The data may be received from a data source such as a machine, a piece of equipment, a sensor, and the like.

At block 606, the method 600 modulates a light emitted by the light fixture to carry the data. In one embodiment, the light may be modulated by turning a light source in the light fixture on and off. In another embodiment, the light may be modulated by changing a brightness level of the light source in the light fixture. For example, the brightness may be varied with 16 or 24 bit resolution and can convey more information than turning the light source on and off.

In one embodiment, the light fixture may have a single set of LEDs that is used for illumination and for modulation to carry the data. In another example, the light fixture may include a first set of LEDs dedicated to illumination and a second set of LEDs dedicated to being modulated to carry the data.

In one embodiment, the light source may emit light at a wavelength between approximately 380 nm to 780 nm. In one embodiment, the light may be modulated at a frequency between 10 kilohertz to 770 terahertz. In one embodiment, the light may be modulated at a frequency between 420 terahertz to 770 terahertz. In one embodiment, the light may be modulated at a frequency between 10 kilohertz to 1 terahertz.

In one embodiment, the light may be modulated via a broadband modulator. The light may also be modulated using spread spectrum modulation encoding. For example, FHSS or DSSS can be used modulate the light.

At block 608, the method 600 transmits the light that is modulated to carry the data to a second light fixture. For example, the modulated light that carries the data may be transmitted to the second light fixture. The second light fixture may detect the modulated light signal and either pass the signal to another light fixture or demodulate the modulated light signal to obtain the data. The data may then be transmitted to a data destination (e.g., a remote server, a remote database, a remote sensor, a remote computing device, and the like). At block 610, the method 600 ends.

It should be noted that steps, operations, or blocks in FIG. 6 that recite a determining operation, or involve a decision, do not necessarily require that both branches of the determining operation be practiced. In other words, one of the branches of the determining operation can be deemed as an optional step. Furthermore, operations, steps, or blocks of the above described methods can be combined, separated, and/or performed in a different order from that described above, without departing from the example embodiments of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A light fixture, comprising:
a light source comprising a first array of light emitting diodes (LEDs) to emit light at a first wavelength to illuminate a location and a second array of LEDs to emit light at a second wavelength;
a photo detector to detect an incoming light;
a transceiver to receive outgoing data from a data source and to transmit the outgoing data via radio frequency signals to a data destination;
a modulator/demodulator to modulate the light emitted by the second array of LEDs at the second wavelength with the outgoing data via direct sequence spread spectrum (DSSS) modulation to generate a modulated light signal with the outgoing data and to demodulate the incoming light that includes incoming data, wherein the light emitted by the second array of LEDs is modulated by varying a brightness of the second array of LEDs with 16 bit or 24 bit resolution at a frequency between 1 kilohertz to 1 terahertz; and
a processor communicatively coupled to the light source, the photo detector, the transceiver, and the modulator/demodulator, wherein the processor is to control the modulator/demodulator to modulate the light emitted by the second array of LEDs at a transmission frequency to transmit the outgoing data via the modulated light signal to a second light fixture.

2. The light fixture of claim 1, wherein the processor is to control the modulator/demodulator to demodulate the incoming light at a reception frequency to obtain the incoming data.

3. The light fixture of claim 1, wherein the light emitted by the second array of LEDs is emitted at a wavelength between 380 nanometers (nm) and 780 nm.

4. A method, comprising:
receiving, via a processor of a light fixture, outgoing data from a data source;
modulating, by the processor, a light emitted by the light fixture via direct sequence spread spectrum (DSSS) modulation to carry the outgoing data, wherein the light emitted by the light fixture is modulated by varying a brightness of an array of LEDs with 16 bit or 24 bit resolution at a frequency between 430 terahertz and 770 terahertz; and
transmitting, by the processor, the light that is modulated to carry the outgoing data to a second light fixture at a transmission frequency, wherein the second light fixture is to transmit the outgoing data to a data destination via radio frequency signals.

5. The method of claim 4, wherein the light emitted by the light fixture is emitted at a wavelength between 380 nanometers (nm) and 780 nm.

6. A light fixture, comprising:
a light source comprising a first array of light emitting diodes (LEDs) to emit light at a first wavelength to illuminate a location and a second array of LEDs to emit light at a second wavelength;
a photo detector to detect an incoming light from a second light fixture, wherein the incoming light includes data from a data source;
a demodulator to demodulate the incoming light to obtain the data from the data source;
a transceiver to transmit the data via radio frequency signals to a data destination;
a modulator to modulate light emitted by the second array of LEDs at the second wavelength with the data via direct sequence spread spectrum (DSSS) modulation to generate a modulated light signal with the data to transmit to a third light fixture, wherein the light emitted by the second array of LEDs is modulated by varying a brightness of the second array of LEDs with 16 bit or 24 bit resolution at a frequency between 1 kilohertz to 1 terahertz; and a processor communicatively coupled to the light source, the photo detector, the demodulator, the transceiver, and the modulator, wherein the processor is to control the modulator to modulate the light emitted by the second array of LEDs at a transmission frequency to transmit the data via the modulated light signal.

7. The light fixture of claim 6, wherein the light emitted by the second array of LEDs is emitted at a wavelength between 380 nanometers (nm) and 780 nm.

* * * * *